: US 8,008,394 B2
(45) Date of Patent: *Aug. 30, 2011

(12) United States Patent
Stricker et al.

(10) Patent No.

(54) LOW-VOC PRIMER FOR PLASTIC COATING

(75) Inventors: Wolfgang Stricker, Remscheid (DE);
Udo Hellmann, Remscheid (DE);
Yvonne Seulen, Sprockhoevel (DE);
Rolf Lackmann, Bonn (DE)

(73) Assignee: E.I. du Pont de Nemours & Company, Wilmington, DE (US)

( * ) Notice: Subject to any disclaimer, the term of this patent is extended or adjusted under 35 U.S.C. 154(b) by 1079 days.

This patent is subject to a terminal disclaimer.

(21) Appl. No.: 11/180,205

(22) Filed: Jul. 13, 2005

(65) Prior Publication Data

US 2007/0014926 A1    Jan. 18, 2007

(51) Int. Cl.
*C08L 67/02* (2006.01)
*C08G 63/668* (2006.01)
*C08G 63/127* (2006.01)
*C08G 63/685* (2006.01)
*C08G 63/12* (2006.01)
*C08G 18/42* (2006.01)
*B32B 27/36* (2006.01)

(52) U.S. Cl. ........ 524/601; 528/297; 528/302; 528/308; 528/366; 525/438; 525/440.01; 428/482

(58) Field of Classification Search ............... 427/372.2, 427/402; 428/482; 524/601; 528/297, 302, 528/308, 366; 525/438, 440.01
See application file for complete search history.

(56) References Cited

U.S. PATENT DOCUMENTS

| 4,997,882 | A | * | 3/1991 | Martz et al. ............. 525/65 |
| 5,319,032 | A | * | 6/1994 | Martz et al. ............. 525/301 |
| 5,397,602 | A | * | 3/1995 | Martz et al. ............. 427/393.5 |
| 5,753,756 | A | * | 5/1998 | Aerts et al. ............. 525/111.5 |
| 6,203,913 | B1 | * | 3/2001 | Kondos et al. ............. 428/423.1 |
| 6,245,695 | B1 | * | 6/2001 | Maruo et al. ............. 442/136 |
| 6,277,497 | B1 | | 8/2001 | Aerts et al. |
| 6,902,820 | B2 | * | 6/2005 | Huybrechts et al. ............. 428/482 |
| 2003/0229179 | A1 | * | 12/2003 | Merritt et al. ............. 525/92 K |
| 2006/0223953 | A1 | * | 10/2006 | Drescher et al. ............. 525/375 |

FOREIGN PATENT DOCUMENTS

| EP | 630924 | A2 | * | 12/1994 |
| GB | 1528802 | | | 10/1978 |
| JP | 2002282774 | A | * | 10/2002 |

OTHER PUBLICATIONS

English machine translation of JP 2002-282774.*
Copending U.S. Appl. No. 10/671,217, filed Sep. 25, 2003.

* cited by examiner

*Primary Examiner* — David W Wu
*Assistant Examiner* — Michael Pepitone
(74) *Attorney, Agent, or Firm* — Sudhir G. Deshmukh

(57) ABSTRACT

The invention is directed to coating compositions for direct coating of plastic substrates, comprising the following components:

A) a hydroxy-functional binder component, comprising at least one branched hydroxy-functional polyester having a hydroxyl value of 50-300 mg KOH/g solid, a polydispersity of <2 and a number average molecular weight (Mn) of 300 to 4000, having at least three branches, and having at least one hydroxyl group on each of the at least three branches, B) a crosslinking component for the hydroxyfunctional binder component A), C) at least one adhesion promoting component and optionally, D) organic solvents, additives conventionally found in paints as well as pigments and/or fillers.

9 Claims, No Drawings

LOW-VOC PRIMER FOR PLASTIC COATING

BACKGROUND OF THE INVENTION

The invention relates to two-pack primers having a high solids content and based on OH-functional polyesters and polyisocyanate crosslinking agents, for the painting of plastics materials. The primers may advantageously be used in vehicle and industrial painting.

DESCRIPTION OF RELATED ART

Within the next few years, environmental regulations, which increasingly demand the reduction of the content of volatile organic compounds (VOC) in paints, are to be expected. For example, primers for the painting of plastics material are also being reclassified in accordance with the European VOC regulation. The limit value for volatile organic compounds will then be 540 g/l. The challenge is therefore to find suitable coating compositions for the painting of plastics material which, on the one hand, have a high solids content and thus comply with the regulation on solvent emissions and, on the other hand, exhibit good adhesion to the respective plastics material substrate. Chlorinated polyolefins (CPOs), as the best known adhesion promoters, are conventionally used. However, to achieve the required high solids content in the coating composition the CPOs have to be combined with additional binder component(s) and the CPOs are not entirely unproblematic with regard to their compatibility with various binder types. So the CPO component of a coating composition often has to be provided as an individual component, separately from the component containing the binder.

U.S. Pat. No. 6,277,497 describes branched hydroxy-functional polyester oligomers, having tertiary ester end groups and are produced from polycarboxylic acids and tertiary glycidyl esters of carboxylic acids, preferably, pivalic acid glycidyl ester, but those coating compositions do not contain chlorinated polyolefines and are used as clear coats or top coats in multilayer coating.

Consequently, there was a demand for multi-purpose adhesion-promoting solvent-based coating compositions for the painting of plastics materials, known as adhesion primers, which on the one hand have a high solids content with sufficiently low viscosity, which are compatible with conventional adhesion promoters, in particular with chlorinated polyolefins, and which remain homogeneous in formulations containing said adhesion promoters without limiting the shelf life. The primers should be multi-purpose pigmented or non-pigmented primers and should crosslink with polyisocyanates, exhibit good adhesion to as many plastics materials as possible, for example, to the exterior region of motor vehicles.

SUMMARY OF THE INVENTION

The invention is directed to solvent-based two-component coating compositions for direct coating of plastic substrates, comprising the following components:
A) a hydroxy-functional binder component, comprising at least one branched hydroxy-functional polyester having a hydroxyl value of 50 to 300 mg KOH/g solid, preferably of 80 to 220 mg KOH/g solid, a polydispersity (Mw/Mn) of <2, especially preferred of 1.5 and <1.5 and a number average molecular weight (Mn) of 300 to 4000, preferably of 700-1500, having at least three branches, and having at least one hydroxyl group on each of the at least three branches, wherein the polyester comprises reacted the following components:
 a) at least one polycarboxylic acid anhydride,
 b) at least one polyol having at least three hydroxyl groups and
 c) at least one glycidyl ester of a saturated monocarboxylic acid branched in the alpha position, wherein the saturated monocarboxylic acid branched in the alpha position is selected from a group consisting of alpha-alkylalkane monocarboxylic acid having 7 to 13 carbon atoms in the acid molecule, preferably, having 9 to 11 carbon atoms in the acid molecule, alpha,alpha'-dialkylalkane monocarboxylic acids having 7 to 13 carbon atoms in the acid molecule, preferably, having 9 to 11 carbon atoms in the acid molecule and mixtures thereof,
B) a crosslinking component for the hydroxyfunctional binder component, preferably, a crosslinking component comprising at least one polyisocyanate crosslinking agent having free isocyanate groups,
C) at least one adhesion promoting component, preferably, at least one chlorinated polyolefin and optionally,
D) organic solvents, additives conventionally found in paints as well as pigments and/or fillers.

Preferably, the polyester A) comprises reaction product of 20-50% by weight, most preferred, 30-40% by weight of component a)
2-30% by weight, most preferred, 5-20% by weight of component b) and
30-80% by weight, most preferred, 40-70% by weight of component c),
wherein the % by weight of components a), b) and c) is adding up to 100% by weight.

Surprisingly, it has been found that the coating compositions of the present invention have, on the one hand, a high solids content corresponding to a VOC value of 540 g/l and <540 g/l and that said coating compositions, when applied directly onto plastics materials, exhibit very good adhesion to the various plastics material substrates, in particular, also to relatively non-polar plastics materials, such as, polypropylene, or to polypropylene blends, such as, polypropylene ethylene diene copolymers (PP-EPDM). A storage-stable homogeneous hydroxyfunctional component could be provided, which contains the hydroxyfunctional binder A) and the adhesion promoter B).

DETAILED DESCRIPTION OF THE EMBODIMENTS

The invention will be described below in greater detail.
Unless stated otherwise, all molecular weights (both number and weight average molecular weight) referred to herein are determined by GPC (gel permeation chromatographie) using polystyrene as the standard.

The present invention is directed to solvent-based coating compositions. Solvent-based coating compositions are coating compositions, wherein organic solvents are used as thinner when preparing and/or applying the coating composition.

The coating compositions according to the invention contain hydroxyfunctional binders A). It is fundamental to the invention that at least one branched star polyester described above is present as a hydroxyfunctional binder A).

The hydroxy-functional branched polyester A) with having at least one hydroxyl group on each of the at least three separate branches of the polyester comprises as a structural element preferably 30-80 wt-%, more preferably 40-70 wt-% and most preferably 45-65 wt-%, relative to the total quantity of the polyester, of a branched acid ester group resulting from the glycidyl ester component c). For example, that structural element may be one of the following general formula I:

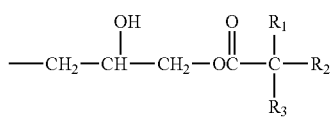

wherein R1 and R3 are independently selected from C1 to C3 alkyl and wherein one of R1 or R3 may be H and wherein R2 is C3 to C9 alkyl, with the proviso that the total number of carbon atoms of the three radicals R1, R2 and R3 being between 5 and 11, preferably between 7 and 9.

Component a) to be used in the process of preparing the hydroxy-functional polyester A) is a polycarboxylic acid anhydride. The polycarboxylic acid anhydride may also have at least one carboxyl group. Polycarboxylic acids, which may, for example, be used, are the acid anhydrides of polycarboxylic acids with 4 to 54 carbon atoms. Examples of polycarboxylic acids are those having a molecular weight from approximately 116 to 1,000, for example, maleic acid, phthalic acid, isophthalic acid, trimellitic acid, dodecanedicarboxylic acid, tetrahydrophthalic acid, hexahydrophthalic acid, methylhexahydrophthalic acid, cyclohexane-1,2- and -1,4-dicarboxylic acid, sebacic acid, adipic acid and dimer fatty acids, such as, commercially available Pryol 1009 and 1010. Preferred examples of usable acid anhydrides are hexahydrophthalic anhydride, methylhexahydrophthalic anhydride, phthalic anhydride and trimellitic anhydride. The polycarboxylic acid anhydrides can be used alone or in combination.

Component b) to be used in the process of preparing the hydroxy-functional polyester A) is a polyhydric alcohol having at least three hydroxyl groups. Examples of those polyhydric alcohols are: trimethylolpropane, trimethylolethane, ditrimethylolpropane, monopentaerythritol, di-pentaerythritol, tripentaerythritol, glycerine, and the like, and mixtures thereof. The polyhydric alcohol may be employed in admixture with up to 50 mole-% of one or more alcohols having two hydroxyl groups. Examples of those alcohols are ethylene glycol, propylene glycol and neopentylglycol.

Preferred examples of alcohols are trimethylolpropane, trimethylolethane, ditrimethylolpropane, monopentaerythritol and/or dipentaerythritol.

Preferably, the following are used as components a) and b): hexahydrophthalic anhydride, methylhexahydrophthalic anhydride, trimellitic anhydride and/or phthalic anhydride as component a) and trimethylolpropane, trimethylolethane, ditrimethylolpropane, monopentaerythritol and/or dipentaerythritol as component b). Especially preferred is monopentaerythritol as component b).

Component c) to be used in the process of preparing the hydroxy-functional polyester A) is a glycidyl ester of a saturated monocarboxylic acid branched in the alpha position, wherein the saturated monocarboxylic acid branched in the alpha position is an alpha-alkylalkane monocarboxylic acid and/or an alpha,alpha'-dialkylalkane monocarboxylic acid each having 7 to 13 carbon atoms in the acid molecule, preferably, having 9 to 11 carbon atoms in the acid molecule. A preferred example of a glycidyl ester is the glycidyl ester of versatic acid (neodecanoic glycidyl ester). Those glycidyl esters are commercially available, for example, as Cardura® E10 P (from Resolution).

Preferred polyesters A) are obtained by reacting hexahydrophthalic anhydride, methylhexahydrophthalic anhydride, phthalic anhydride and/or trimellitic anhydride with monopentaerythritol and/or dipentaerythritol and with the glycidyl ester of versatic acid.

A possible way of preparing the hydroxyfunctional branched polyester A) is the ring-opening polycondensation of polyol b) with polycarboxylic acid anhydride a) under formation of the corresponding dicarboxylic acid half ester as an intermediate and the subsequent reaction of the intermediate carboxy functional polycondensation product with the glycidyl ester of a saturated monocarboxylic acid branched in the alpha position c) to convert the acid groups into hydroxy groups. It is important that in the step of ring-opening polycondensation of polyol b) with polycarboxylic acid anhydride a) essentially no esterification takes place through elimination of water. But it is possible that some esterification takes place as side reaction. Usually up to 10%, preferably up to 5% of the formed acid groups formed under ring-opening polycondensation may react under esterification. A further side reaction which may take place is the reaction of the epoxy groups of glycidyl ester with the hydroxy groups under ether formation. It should be ensured that no more than 10%, preferably no more than 5% of the epoxy groups react with the hydroxy groups.

The ring-opening polycondensation of the polyol and the acid anhydride is carried out by techniques known to those skilled in the art. Generally, the reaction can be conducted by combining the polyol and the anhydride, and heating to a temperature of 100° C. to 170° C., and holding the reaction mixture at that temperature until the theoretical acid number is reached. The subsequent reaction with the glycidyl ester is carried out by combining the reactants and heating at 100° C. to 170° C., and holding the reaction mixture at that temperature until full conversion of acid and epoxy groups, determined by acid number of epoxy groups using standard titration methods.

A catalyst can be used to accelerate ring-opening polycondensation reaction. Usually employed are: organotin catalysts, such as, dibutyltindilaurate, dibutyltinoxide, tinoctoate, and the like; tri-substituted amines, such as, triethylamine, dimethyl benzylamine, dimethyl ethanolamine, triethanolamine and the like; tertiary amine salts, such as, benzyltrimethylammonium hydroxide, tetrabutylammonium iodide and the like; phosphonium-containing catalysts, such as, ethyltriphenylphosphonium iodide, ethyltriphenylphosphonium bromide and the like.

The catalyst is optional, and if used, the amount added can vary widely. When used, the amount typically ranges from about 0.01 to 1 weight percent, based on binder solids of components a) and b).

In an alternative reaction procedure, the hydroxy-functional polyester A) can be obtained by reacting the intermediate dicarboxylic acid half ester (polycondensation product of components a) and b)) subsequently with epichlorhydrin and then with a saturated monocarboxylic acid branched in the alpha position which is selected from a group consisting of alpha-alkylalkane monocarboxylic acid having 7 to 13 carbon atoms in the acid molecule, preferably, having 9 to 11 carbon atoms in the acid molecule, alpha,alpha'-dialkylalkane monocarboxylic acids having 7 to 13 carbon atoms in the acid molecule, preferably, having 9 to 11 carbon atoms in the acid molecule and mixtures thereof. Examples of saturated monocarboxylic acids branched in the alpha position are those as described above in the description of the glycidyl ester of saturated monocarboxylic acids branched in the alpha position. Therefore, the phrase "the polyester comprises reacted c) at least one glycidyl ester of a saturated monocarboxylic acid branched in the alpha position, wherein the saturated monocarboxylic acid branched in the alpha position is selected from a group consisting of alpha-alkylalkane monocarboxylic acid having 7 to 13 carbon atoms in the acid molecule, alpha,alpha'-dialkylalkane monocarboxylic acids having 7 to 13 carbon atoms in the acid molecule, and mixtures thereof" shall include the equivalent alternative of using epichlorhydrin and a saturated monocarboxylic acid branched in the alpha position which is selected from a group consisting of alpha-alkylalkane monocarboxylic acid having 7 to 13 carbon atoms in the acid molecule, alpha,alpha'-dialkylalkane monocarboxylic acids having 7 to 13 carbon atoms in the acid molecule, and mixtures thereof, instead of the glycidyl ester of saturated monocarboxylic acids branched in the alpha position.

Polyesters prepared according to the invention by the reaction procedures described above have a narrow molecular weight distribution. They have in general a polydispersity of <2, preferably of 1.5 or <1.5. Such polyesters are sometimes referred to as "star" oligomers because they have a plurality of arms or branches and have an exact functionality.

In addition to the polyesters A) essential to the invention, the coating compositions may contain further hydroxy-functional binders. The further hydroxy-functional binders comprise conventional hydroxy-functional resins such as are, for example, used in the production of single- or two-component cross-linkable, solvent-based coating compositions, in particular, in vehicle coating, and are sufficiently familiar to the person skilled in the art.

Binders containing hydroxyl groups which may be used individually or in combination are, for example, polyurethanes, poly(meth)acrylates and polyesters different from polyesters A). These resins generally have a hydroxyl value of 20 to 250 mg of KOH/g and may optionally, additionally, be modified.

The coating compositions according to the invention may contain 60-100 wt-% of polyesters A) and 0-40 wt-% of further hydroxy-functional binders, wherein the total of weight percentages of polyesters A) and further hydroxy-functional binders is 100 wt-%. The coating compositions according to the invention preferably do not contain further hydroxy-functional binders besides the polyesters A).

The coating compositions according to the invention comprise at least one crosslinking component for the hydroxy-functional binder component. Crosslinking components are, for example, polyisocyanates with free and/or blocked isocyanate groups and melamine resins. Especially preferred polyisocyanate crosslinking agents having free isocyanate groups are used as crosslinking agent B).

The polyisocyanates comprise, for example, any desired organic polyisocyanates having aliphatically, cycloaliphatically, araliphatically and/or aromatically attached free isocyanate groups. The polyisocyanates preferably comprise polyisocyanates or polyisocyanate mixtures having exclusively aliphatically and/or cycloaliphatically attached isocyanate groups with an average NCO functionality of 1.5 to 5, preferably of 2 to 4.

Particularly suitable compounds are, for example, so-called "coating polyisocyanates" based on hexamethylene diisocyanate (HDI), 1-isocyanato-3,5,5-trimethyl-5-isocyanatomethylcyclohexane (IPDI) and/or bis(isocyanatocyclohexyl)methane and the per se known derivatives of said diisocyanates comprising biuret, allophanate, urethane and/or isocyanurate groups. Triisocyanates, such as, triisocyanatononane may also be used.

Sterically hindered polyisocyanates are likewise also suitable. Examples of these are 1,1,6,6-tetramethylhexamethylene diisocyanate, 1,5-dibutylpentamethyl diisocyanate, p- or m-tetramethylxylylene diisocyanate and the corresponding hydrogenated homologues.

Diisocyanates may in principle be reacted in conventional manner to yield more highly functional compounds, for example, by trimerization or by reaction with water or polyols, such as, for example, trimethylolpropane or glycerol.

Corresponding prepolymers containing isocyanate groups may also be used as di- and/or polyisocyanates. The polyisocyanate cross-linking agents may be used individually or in combination.

The coating compositions according to the invention comprise at least one adhesion promoting compound (component C). Preferably chlorinated polyolefins (CPOs) are used as adhesion promoting compounds. Examples for chlorinated polyolefins are chlorinated polyethylene, chlorinated polypropylene, chlorinated polyethylene/polypropylene copolymers or mixtures thereof. The chlorinated polyolefins may exhibit different degrees of chlorination, different molecular weights, different degree of branching and different modifications. The chlorinated polyolefins generally exhibit a degree of chlorination of 15-45 wt-% and may assume the form of a powder, a solution in organic solvents or an aqueous dispersion. The chlorinated polyolefins may, for example, assume the form of a solution in hydrocarbons, preferably, aromatic hydrocarbons. The solids content of solutions of chlorinated polyolefins may be, for example, 18-60 wt-%. The stated products are known to the person skilled in the art and are commercially available, for example, from Eastman. Examples of commercially available products for chlorinated polyolefins are CP 343-1 and CP 515-2 from Krahn Chemie GmbH. Non-chlorinated products may furthermore also be used as adhesion promoters, for example, the product Eastman AP 440-1 (25% in xylene, Eastman).

Also, chemically modified chlorinated polyolefins, such as, acid modified chlorinated polyolefins may be used, e.g., chlorinated polyolefins modified with maleic acid. Such products are commercially available for example, under the name Hardlen CY 9124 from Toyo Kasei Kogyo and under the name Trapylen 135S and Trapylen 822 from Tramaco. Especially preferred are acid modified chlorinated polyolefins, which show an excellent compatibility with binders A).

The coating compositions according to the invention may comprise conventional coating additives. The coating additives comprise the conventional additives usable in the coating sector, in particular, in fillers and primers. Examples of such additives are levelling agents based on (meth)acrylic homopolymers or silicone oils, anticratering agents, antifoaming agents, catalysts, dispersing agents, thickeners and emulsifiers.

The coating compositions according to the invention may comprise an elasticising component which is generally used when particular elasticity of the coating composition is required, for example, when highly flexible plastics, for example, highly flexible polyurethanes, plasticized PVC (polyvinyl chloride) or PVC foils, are to be coated.

The elasticising component may comprises those binders and/or additives having an elasticising action, as are known to the person skilled in the art for the formulation of elastic coating compositions, in particular for coating plastics. Highly elastic polyesters and/or polyurethanes may be used as the elasticising component. Elastic polyesters and polyurethanes are those based on (cyclo)aliphatic linear or slightly branched unsaturated polyesters and polyurethanes.

But it is an advantage of the present invention, that separate elasticising components are actually not necessary to provide the coating composition a particular elasticity. Even the use of the polyester binder component A) provides the required elasticity of the coating composition without using a specific elasticising component.

Organic solvents may also be present in the coating composition according to the invention. Organic solvents comprise conventional coating solvents. These may originate from the production of the binders and/or are added separately. Examples of such solvents are mono- or polyhydric alcohols, for example, propanol, butanol, hexanol; glycol ethers or esters, for example, butyl glycol, butyl diglycol, diethylene glycol dialkyl ethers, dipropylene glycol dialkyl ethers, ethyl glycol acetate, butyl glycol acetate, butyl diglycol acetate, esters, such as, butyl acetate, isobutyl acetate, amyl acetate, glycols, for example, ethylene glycol, propylene glycol and oligomers thereof, N-ethyl-2-pyrrolidone, and ketones, for example, methyl ethyl ketone, acetone, cyclohexanone; aromatic or aliphatic hydrocarbons, for example, toluene, xylene, or linear or branched aliphatic C6-C12 hydrocarbons.

The coating compositions according to the invention may also contain conventional organic and/or inorganic color-imparting pigments and/or extenders as are known to the person skilled in the art for the production of coating compositions, in particular for the production of primer compositions in the vehicle coating sector. Examples of pigments are titanium dioxide, micronized titanium dioxide, iron oxide pigments, carbon black, azo pigments, phthalocyanine pigments, quinacridone and pyrrolopyrrole pigments. Examples of extenders are silicon dioxide, aluminium silicate, aluminium oxide, barium sulfate and talcum.

The coating compositions according to the invention generally have a weight ratio of binders (solids) to extenders and pigments of preferably, 2.0:1.0 to 1.0:2.0, particularly preferably, of 1.5:1.0 to 1.0 to 1.5.

Coating compositions according to the invention are in particular used as primers or priming fillers for coating plastics. They are applied conventionally, preferably by spraying, directly onto the plastics substrates. The coatings are applied, for example, to a final dry film thickness of approx. 20-50 μm. Curing of the resultant coatings, optionally, after a flash-off phase, proceeds preferably at temperatures of room temperature to 100° C., for example, at 20 to 80° C., preferably at 20 to 60° C.

Any plastics materials can be considered as plastics material substrates, such as, polyurethanes, polycarbonates, polyamides, polyesters, acrylonitrile butadiene styrene copolymers, polyvinylchloride, polymethylmethacrylate, glass fibre-reinforced unsaturated polyesters, polypropylene, and polypropylene blends, such as, polypropylene ethylene diene copolymers. The plastics materials are, in particular, those used in automotive engineering.

The primers may be overcoated with any desired conventional coating composition. They may, for example, be overcoated with conventional top coats. The topcoats may comprise single layer topcoats, for example, based on two-component systems (e.g. hydroxy-functional binder/polyisocyanate hardener) or conventional base coat/clear coat structures. The clear coats, but in particular single layer top coats, may optionally contain texture additives to achieve a textured surface. The primers may also be overcoated with conventional filler coating compositions before being topcoated. Overcoating may, in general, be performed with solvent-based or waterborne coating compositions. Once the primer has been applied overcoating may be performed either after drying or curing the primer layer or wet-on-wet, optionally after briefly flashing off.

The present invention therefore also relates to a process for multilayer coating, comprising the following steps:
 I. Applying a primer coat from a coating composition according to the invention (a coating composition as described above) directly onto a plastic substrate,
 II. Optionally curing the applied primer coating composition,
 III. Applying a topcoat layer from a pigmented single layer top coat or a pigmented based coat and a transparent clear coat onto the layer applied in step I and
 IV. Curing the coating.

In combination with adhesion promoters, in particular chlorinated polyolefins, the coating compositions according to the invention exhibit good general adhesion to a wide range of plastics material substrates, in particular, also to relatively non-polar plastics materials, such as, polypropylene or polypropylene ethylene/propylene diene copolymers (PP-EPDM). The coating compositions according to the invention also exhibit good adhesive properties on untreated non-polar plastics materials, so that a special pre-treatment of the relatively non-polar plastics materials, which are conventionally relatively difficult to paint, for example, by means of flame treatment or plasma treatment, is not required.

Coating compositions according to the invention may in particular be used as primers or priming fillers for coating plastics in vehicle and industrial coating operations. According to the invention they are, however, in particular suitable for use in vehicle repair coating, for example, in a paint body shop. The coating compositions show a good long-term stability and meet the specified quality requirements for different grades of plastics, e.g., within the automotive industries.

The following Examples are intended to illustrate the invention in greater detail.

EXAMPLES

Binder Example 1

Preparation of Hydroxyfunctional Polyester 1

160.16 g amount of butylacetate, 136 g of monopentaerythritol, and 504 g of methylhexahydrophthalic anhydride are loaded in a glass reactor and heated to reflux until dissolved (140-160° C.). Afterwards, 750 g of neodecanoic acid glycidyl ester (Cardura® E10 (glycidyl ester of versatic acid) from Resolution) are added, followed by 1.39 g of dibutyl tin dilaurate dissolved in 8.61 g of butylacetate. The mixture is further refluxed (175° C.) until the acid number is below 3. A further 177.33 g of butylacetate are added. The total reaction time is about 3 hours. The hydroxy number is calculated from the theoretical structure.

Test Results:
Solids: 80.5%
Viscosity (Gardner-Holdt): X
Acid number: 2.8 mg KOH/g solids
Mn: 1190
Mw: 1460
Polydispersity Mw/Mn: 1.2
OH number (theoretical): 161 mg KOH/g solids

Binder Example 2

Preparation of Hydroxyfunctional Polyester 2)

29.73 parts methylhexahydrophtalic anhydride, 11.15 parts butylacetate and 6.02 parts monopentaerythritol are charged in a reaction vessel under nitrogen and heated at reflux while stirring (140-160° C.) for 1 hour.

44.25 parts neodecanoic acid glycidyl ester (Cardura® E10 (glycidyl ester of versatic acid) from Resolution) are added to the reactor over 60 minutes. Afterwards 0.89 parts butylacetate are added for rinsing. The reaction mixture is stirred at reflux (175° C.) until the acid number is lower or equal to 2 mg KOH/g solids. 7.96 parts butylacetate are added as final thinning.

Test Results:
Solids: 80.6%
Viscosity (Gardner-Holdt): X,
Acid number: 1.2 mg KOH/g solids
Weight average molecular weight (Mw): 1700
Number average molecular weight (Mn): 1400
Polydispersity Mw/Mn: 1.2
OH number (theoretical): 124 mg KOH/g solids Binder Example 3

Preparation of Hydroxyfunctional Polyester 3

17.72 parts phthalic anhydride, 9.23 parts hexahydrophtalic anhydride, 9.30 parts butylacetate and 8.15 parts pentaerythritol are charged in a reaction vessel under nitrogen and heated at reflux while stirring (140-160° C.) for 1 hour.

44.91 parts neodecanoic acid glycidyl ester (Cardura® E10 (glycidyl ester of versatic acid) from Resolution) are added to the reactor over 60 minutes. Afterwards 0.87 parts butylacetate are added for rinsing. The reaction mixture is stirred at reflux (175° C.) until the acid number is lower or equal to 2.5 mg KOH/g solids. 9.82 parts butylacetate are added as final thinning.

Test Results:
Solids: 81.8%
Viscosity (Gardner-Holdt): X+½
Acid number: 0.9 mg KOH/g solids
Weight average molecular weight (Mw): 1600
Number average molecular weight (Mn): 1100
Polydispersity Mw/Mn: 1.4
OH number (theoretical): 168 mg KOH/g solids Binder Comparative Example 1

Preparation of Comparative Hydroxyfunctional Polyester 4

21.82 parts neodecanoic acid glycidyl ester (Cardura® E10 (glycidyl ester of versatic acid) from Resolution), 30.43 parts phthalic anhydride, 19.88 parts trimethylolpropane are charged in a reaction vessel under nitrogen equipped with a water separator and heated to 130° C. while stirring. Heating is stopped and the temperature will rise to 180-190° C. At this temperature heating is started again and temperature is raised to 225° C. over 3 hours. The reaction mixture is stirred at 225° C. till acid number is between 11-14 mg KOH/g solids and viscosity is between Z2-Z3 (Gardner-Holdt) at 70% solids dissolved in xylene. 2.13 parts of reaction water will be stripped off in the water separator. 30 parts of xylene are added as final thinning.

Test Results:
Solids: 70.4%
Viscosity (Gardner-Holdt): Z2+½
Acid number: 11.4 mg KOH/g
Weight average molecular weight (Mw): 5800
Number average molecular weight (Mn): 2000
Polydispersity Mw/Mn: 2.9
OH number (theoretical): 170 mg KOH/g Binder Comparative Example 2

Preparation of Comparative Hydroxyfunctional Polyester 5

The following components were charged to a reactor equipped with stirrer, condenser and nitrogen blanket:
244.00 g methylamylketone
136.00 g monopentaerythritol
4.80 g 9,10-dihydro-9-oxa-10-phosphaphenanthrene*
*available from Sanko chemical company as Sanko HCA.
4.80 g tetraethylammoniumbromide
654.16 g methylhexahydrophthalic anhydride/hexahydrophthalic anhydride blend**
**available from Milliken chemical company as Milldride MHHPA.

The mixture was heated to 140° C. and hold at 140° C. for 2 hours
Then 184.8 g ethyleneoxide were fed to the reactor over 4 hours.
The batch temperature was maintained of 125° C. and hold until an acid number below 2.0 mg KOH/g solids was achieved.
Solids: 80%
Viscosity (Gardner-Holdt): Z2
Compatibility Tests The polyesters 1 to 3 prepared in the resin examples 1 to 3 and the comparison polyesters 4 and 5 were tested with respect to their compatibility with a CPO-based adhesion promoter (Hardlen CY9124, Toyo Kasei Kogyo Co., Ltd.) The components (corresponding to the mixing ratio in Table 1) were mixed with each other while stirring. The results after various treatments are shown in Table 2.

TABLE 1 results in % by weight

| Component | Example 1 | Example 2 | Example 3 | Example 4 | Example 5 |
|---|---|---|---|---|---|
| Polyester 1 | 55.00 | | | | |
| Polyester 2 | | 55.00 | | | |
| Polyester 3 | | | 55.00 | | |
| Comparative Polyester 4 | | | | 55.00 | |
| Comparative Polyester 5 | | | | | 63.00 |
| Xylene | 26.00 | 26.00 | 26.00 | 26.00 | 18.00 |
| CPO | 69.00 | 69.00 | 69.00 | 69.00 | 69.00 |

TABLE 2

| | Example 1 | Example 2 | Example 3 | Example 4 | Example 5 |
|---|---|---|---|---|---|
| Miscibility | good | good | good | bad | bad |
| Appearance directly | clear | clear | clear | slightly turbid separation | extremely turbid separation |
| Appearance after 72 h RT | clear | clear | clear | | |
| Appearance 24 h/50° C. warm | clear | clear | clear | | |
| Appearance 24 h/50° C. cooled to RT | clear | clear | clear | | |
| Appearance 24 h/4° C. directly | clear | clear | clear | | |
| Appearance 24 h/−20° C. directly | clear | clear | clear | | |
| Appearance 24 h/−20° C. warmed up to RT | clear | clear | clear | | |

RT = room temperature

The mixtures according to the invention of polyesters 1 to 3 and the adhesion promoter exhibited very good compatibility, even after heating and cooling.

The mixtures with the comparison polyesters however appeared turbid directly after mixing and even segregated after 72 hours. Therefore, further paint tests were not carried out with the comparison polyesters.

Preparation of Primers

A primer P1 according to the invention was prepared as follows:

The following components were mixed together and dispersed with glass beads in bead mill:
16.70% by weight polyester 1,
0.60% by weight Bentone® 38 (thickening agent),
0.55% by weight Aerosil® R 972 (antisettling agent from Degussa),
0.04% by weight carbon black FW 200,
9.10% by weight Kaolin® (aluminium silicate hydrate),
11.40% by weight barium sulphate,
11.60% by weight TiO$_2$,
8.90% by weight xylene.
30% by weight of a chlorinated polyolefin (Hardlen CY9124, 20%), 6.75% by weight of the polyester 1, 0.36% by weight xylene and 4.00% by weight of a catalyst (1% DBTL (dibutyl tin dilaurate solution in butyl acetate) were added while stirring.

Primers P2 and P3 according to the invention were similarly prepared, with the difference that polyester 1 was accordingly replaced by polyester 2 and polyester 3.

The primers P1 to P3 had a VOC value of <540 g/l.

Application of the Primers P1 to P3

The primers P1 to P3 were applied according to the invention as follows:

PP-EPDM plates ("Difficult to paint" quality, Sabic® 2607 from Sabic) were polished lightly and cleaned with an alcohol-containing cleaning agent. The primers P1 to P3 were each mixed with a polyisocyanate curing agent (Standox® 2K-HS curing agent from DuPont) in a ratio by weight of 6:1, adjusted to spray viscosity with 4% by weight xylene and applied to the plastics material sheets in the resulting dry layer thickness of 35 μm.

A solvent-based base paint (Standox® base paint, Opel Lagoblau L296 from DuPont) was then (after 15 minutes of drying time at ambient temperature) applied and a solvent-based clear coat (Standoxe 2K-HS clear coat from DuPont plus 15% of Standox® 2K elastic additive from DuPont) was then applied to the base paint layer after 15 minutes of drying time at ambient temperature. The entire coating composition (after a drying time of 10 minutes at ambient temperature) was then cured for 30 minutes at 60° C. The paint results are shown in Table 3.

Testing Methods
Humidity Test: according to DIN 50017
Blisters: according to DIN EN ISO 4628-2
Crosscut: according to DIN 53151
High pressure clean VW Test: according to TL 211/PV 1503 (distance: 15 cm, pressure: 90 bar, temperature: 60° C., angle: 45°).

What is claimed is:

1. Coating compositions for direct coating of plastic substrates, consisting of the following components:
   A) a hydroxy-functional binder component, consisting essentially of at least one branched hydroxy-functional polyester having a hydroxyl value of 50-300 mg KOH/g solid, a polydispersity Mw/Mn of <2 and a number average molecular weight (Mn) of 300 to 4000, having at least three branches, having at least one hydroxyl group on each of the at least three branches and wherein the polyester comprises reacted the following components:
      a) 20-50% by weight of at least one polycarboxylic acid anhydride selected from a group consisting of hexahydrophthalic anhydride, methylhexahydrophthalic anhydride, phthalic anhydride, trimellitic anhydride and mixtures thereof,
      b) 2-30% by weight of at least one polyol having at least three hydroxyl groups selected from a group consisting of trimethylolpropane, trimethylolethane, ditrimethylolpropane, monopentaerythritol, dipentaerythritol and mixtures thereof and
      c) 30-80% by weight of at least one glycidyl ester of a saturated monocarboxylic acid branched in the alpha position, wherein the saturated monocarboxylic acid branched in the alpha position is selected from a group consisting of alpha-alkylalkane monocarboxylic acid having 7 to 13 carbon atoms in the acid molecule, alpha,alpha'-dialkylalkane monocarboxylic acids having 7 to 13 carbon atoms in the acid molecule, and mixtures thereof,
      wherein the % by weight of components a), b) and c) add up to 100% by weight,
   B) a crosslinking component for the hydroxyfunctional binder component A) that comprises at least one polyisocyanate crosslinking agent having free isocyanate groups,
   C) at least one adhesion promoting component comprising at least one chlorinated polyolefin and,
   D) organic solvents, organic pigments, inorganic pigments, fillers, extenders, leveling agents based on silicone oils, anticratering agents, antifoaming agents, catalysts, dispersing agents, thickeners, emulsifiers, or a combination thereof.

TABLE 3

|  | Blisters m/g (240 h humid./ 1 h recovery) | Blisters m/g (240 h humid./ 24 h recovery) | Crosscut (before humidity) | Crosscut (240 humid./ 1 h recovery) | Crosscut (240 humid./ 24 h recovery) | High press. clean VW (before humidity) |
|---|---|---|---|---|---|---|
| Primer 1 | 0-1/0-1 | 0/0 | GT 0 | GT 0 | GT 0 | 0 mm |
| Primer 2 | 2/1-2 | 1/1 | GT 0-1 | GT 1 | GT 0 | 2.9 mm (1 spot) |
| Primer 3 | 2/2 | 2/1 | GT 0-1 | GT 1 | GT 0 | 4.0 mm (some very small spots) |

The primers according to the invention exhibited very good adhesion to the plastics material substrate even after a humidity test lasting for 240 hours. And even after extreme load, e.g., after the high pressure clean VW test, the primers exhibited an excellent adhesion to the substrate.

2. Coating composition of claim 1, wherein the polyester A) comprises reacted
   30-40% by weight of component a)
   5-20% by weight of component b) and
   40-70% by weight of component c), wherein the % by weight of components a), b) and c) is adding up to 100% by weight.

3. Coating composition of any of the preceding claims, wherein the branched hydroxy-functional polyester A) has a polydispersity of <1.5.

4. Coating composition of claim 1, wherein the branched hydroxy-functional polyester A) has a hydroxyl value of 80-220 mg KOH/g solid and a number average molecular weight (Mn) of 700 to 1500.

5. Coating composition of claim 1, wherein component c) is a glycidyl ester of a saturated monocarboxylic acid branched in the alpha position, wherein the saturated monocarboxylic acid branched in the alpha position is selected from a group consisting of alpha-alkylalkane monocarboxylic acid having 9 to 11 carbon atoms in the acid molecule, alpha,alpha'-dialkylalkane monocarboxylic acids having 9 to 11 carbon atoms in the acid molecule, and mixtures thereof.

6. Coating composition of claim 1, wherein component c) is neodecanoic glycidyl ester.

7. Coating composition according to claim 1, wherein component a) is hexahydrophthalic anhydride, methylhexahydrophthalic anhydride, phthalic anhydride and/or trimellitic anhydride, wherein component b) is monopentaerythritol and/or dipentaerythritol and wherein component c) is neodecanoic glycidyl ester.

8. Coating composition of claim 1, wherein the hydroxy-functional polyester comprises reacted as component c) epichlorhydrin and a saturated monocarboxylic acid branched in the alpha position which is selected from a group consisting of alpha-alkylalkane monocarboxylic acid having 7 to 13 carbon atoms in the acid molecule, alpha,alpha'-dialkylalkane monocarboxylic acids having 7 to 13 carbon atoms in the acid molecule and combinations thereof.

9. Coating composition according to claim 1, wherein component C) comprises at least one acid modified chlorinated polyolefin.

* * * * *